United States Patent
Oon et al.

(10) Patent No.: US 11,289,791 B1
(45) Date of Patent: Mar. 29, 2022

(54) ANTENNA CONNECTOR WITH INTEGRATED COAXIAL 50-OHM RADIO-FREQUENCY SWITCH

(71) Applicant: MOTOROLA SOLUTIONS, INC., Chicago, IL (US)

(72) Inventors: Alexander Oon, Penang (MY); Poh Imm Goh, Penang (MY); Weng Kong Hor, Penang (MY); Cheah Chan Kee, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/094,676

(22) Filed: Nov. 10, 2020

(51) Int. Cl.
| | | |
|---|---|---|
| *H01Q 1/38* | (2006.01) |
| *H01Q 1/04* | (2006.01) |
| *H01Q 1/22* | (2006.01) |
| *H01Q 1/48* | (2006.01) |
| *H04B 13/02* | (2006.01) |

(52) U.S. Cl.
CPC ............... *H01Q 1/04* (2013.01); *H01Q 1/22* (2013.01); *H01Q 1/38* (2013.01); *H01Q 1/48* (2013.01); *H04B 13/02* (2013.01)

(58) Field of Classification Search
CPC ............ H01Q 1/38; H01Q 1/50; H01Q 1/243; H01Q 3/24; H01Q 21/0006; H01R 13/70; H01R 24/46; H01R 33/96
See application file for complete search history.

(56) References Cited

U.S. PATENT DOCUMENTS

| 5,174,775 A * | 12/1992 | Birch ................... H01R 13/703 200/51.1 |
| 5,944,546 A * | 8/1999 | Miyake .................. H01R 24/46 439/188 |
| 6,520,785 B2 | 2/2003 | Hida |
| 6,734,832 B1 * | 5/2004 | Danowski .............. H01R 13/22 343/906 |
| 6,761,571 B2 | 7/2004 | Hida |

(Continued)

OTHER PUBLICATIONS

Hirose Electric Co., Ltd., "Interface RF Connector with Switch, built-in interlock, DC to 3 GHz," 2020, pp. 125-130.

*Primary Examiner* — Tung X Le
(74) *Attorney, Agent, or Firm* — Michael Best & Friedrich LLP (57) ABSTRACT

An antenna connector for a portable communication device including, in one implementation, a housing bracket, a core mounting member, a front mounting member, and a back mounting member. The housing bracket includes an antenna barrel that is configured to engage a ferrule antenna connector. The core mounting member includes a radio-frequency (RF) switch that includes a ground barrel, a first electrical contact, and a second electrical contact. The second electrical contact is configured to disconnect from the first electrical contact when a coaxial connector engages completely with the ground barrel. The front mounting member includes a front guiding section that is configured to connect with the core mounting member. The front guiding section is further configured to align the ground barrel with the antenna barrel. The back mounting member includes a back guiding section to keep the core mounting member connected to the front guiding section.

20 Claims, 9 Drawing Sheets

(56) References Cited

U.S. PATENT DOCUMENTS

| | | | | |
|---|---|---|---|---|
| 7,131,846 B2 * | 11/2006 | Barlerin | ................. | H01Q 1/088 |
| | | | | 439/63 |
| 7,819,680 B2 | 10/2010 | Hoyack et al. | | |
| 9,472,858 B2 * | 10/2016 | Yeh | ........................ | H01R 29/00 |
| 9,711,847 B2 * | 7/2017 | Tran | ........................ | H01Q 1/088 |
| 2011/0221654 A1 * | 9/2011 | Hsu | ........................ | H01Q 1/088 |
| | | | | 343/906 |
| 2015/0280370 A1 * | 10/2015 | Huang | ................... | H01R 24/46 |
| | | | | 439/188 |
| 2021/0119339 A1 * | 4/2021 | Smith, Jr | ............. | H05K 3/3405 |

\* cited by examiner

ANTENNA CONNECTOR WITH INTEGRATED COAXIAL 50-OHM RADIO-FREQUENCY SWITCH

BACKGROUND OF THE INVENTION

Many portable communication devices (for example, two-way radios) are equipped with external ferrule antennas due to their performance and cost effectiveness. Unlike SMA (Sub-Miniature version A) antennas which provide a 50-ohm impedance connection needed to perform RF (radio-frequency) power test measurements, ferrule antennas do not provide a 50-ohm impedance connection. Thus, portable communication devices configured to operate with ferrule antennas include an RF switch to provide a 50-ohm impedance connection. Some devices include an extra opening in the housing for an RF probe to access to the RF switch. However, opening a hole in the housing is difficult in the field and having an extra hole causes, among other things, water sealing issues and cosmetic problems. Some devices have an RF switch that is separate from the antenna connector but accessible by the hole of the antenna connector. However, these devices are difficult to seal for waterproofing purposes. Further, because the RF switch is separate from the antenna connector, the two can easily become misaligned. This misalignment can cause inconsistency in RF power test measurements and a higher wear rate for RF probes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts that include the claimed invention, and explain various principles and advantages of those implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The system components have been represented where appropriate by conventional symbols in the drawings, showing only those specific details that are pertinent to understanding the implementations of the present disclosure so as not to obscure the present disclosure with details that will be readily apparent to those of ordinary skill in the art having the benefit of the description herein.

DETAILED DESCRIPTION OF THE INVENTION

As noted above, portable communication devices with ferrule antennas include an RF switch to provide a 50-ohm impedance connection needed to perform RF power test measurements. There is a need for an RF switch that do not require a separate opening, maintains alignment with the antenna connector, and is sealed for waterproofing. Among other things, the implementations presented herein provide an antenna connector for a portable communication device with an integrated RF switch that maintains concentricity between the RF switch and the antenna connector and is sealed for waterproofing.

The present disclosure provides an antenna connector for a portable communication device. The antenna connector includes, in one implementation, a housing bracket, a core mounting member, a front mounting member, and a back mounting member. The housing bracket includes an antenna barrel that is configured to engage a ferrule antenna connector. The core mounting member includes a radio-frequency (RF) switch. The RF switch includes a ground barrel, a first electrical contact, and a second electrical contact. The ground barrel is configured to engage a coaxial connector. The second electrical contact is biased for contact with the first electrical contact. The second electrical contact is configured to disconnect from the first electrical contact when the coaxial connector engages completely with the ground barrel. The front mounting member is connected to the housing bracket. The front mounting member includes a front guiding section that is configured to connect with the core mounting member. The front guiding section is further configured to align a center axis of the ground barrel with a center axis of the antenna barrel. The back mounting member includes a back guiding section to keep the core mounting member connected to the front guiding section.

The present disclosure also provides an antenna connector for a portable communication device. The antenna connector includes, in one implementation, a housing bracket, a core mounting member, a front mounting member, and a back mounting member. The housing bracket includes an antenna barrel that is configured to engage a ferrule antenna connector. The core mounting member includes a radio-frequency (RF) switch. The RF switch includes a ground barrel, a first electrical contact, and a second electrical contact. The ground barrel is configured to engage a coaxial connector. The second electrical contact is biased for contact with the first electrical contact. The second electrical contact is configured to disconnect from the first electrical contact when the coaxial connector engages completely with the ground barrel. The front mounting member is connected to the housing bracket. The front mounting member includes a front guiding section that is configured to connect with the core mounting member. The front guiding section is further configured to align the ground barrel with the antenna barrel. The back mounting member includes a back guiding section to keep the core mounting member connected to the front guiding section. The front guiding section and the back guiding section define a U-shaped channel around the core mounting member for water sealing.

For ease of description, some or all of the example systems presented herein are illustrated with a single exemplar of each of its component parts. Some examples may not describe or illustrate all components of the systems. Other example implementations may include more or fewer of each of the illustrated components, may combine some components, or may include additional or alternative components.

Figure 1:
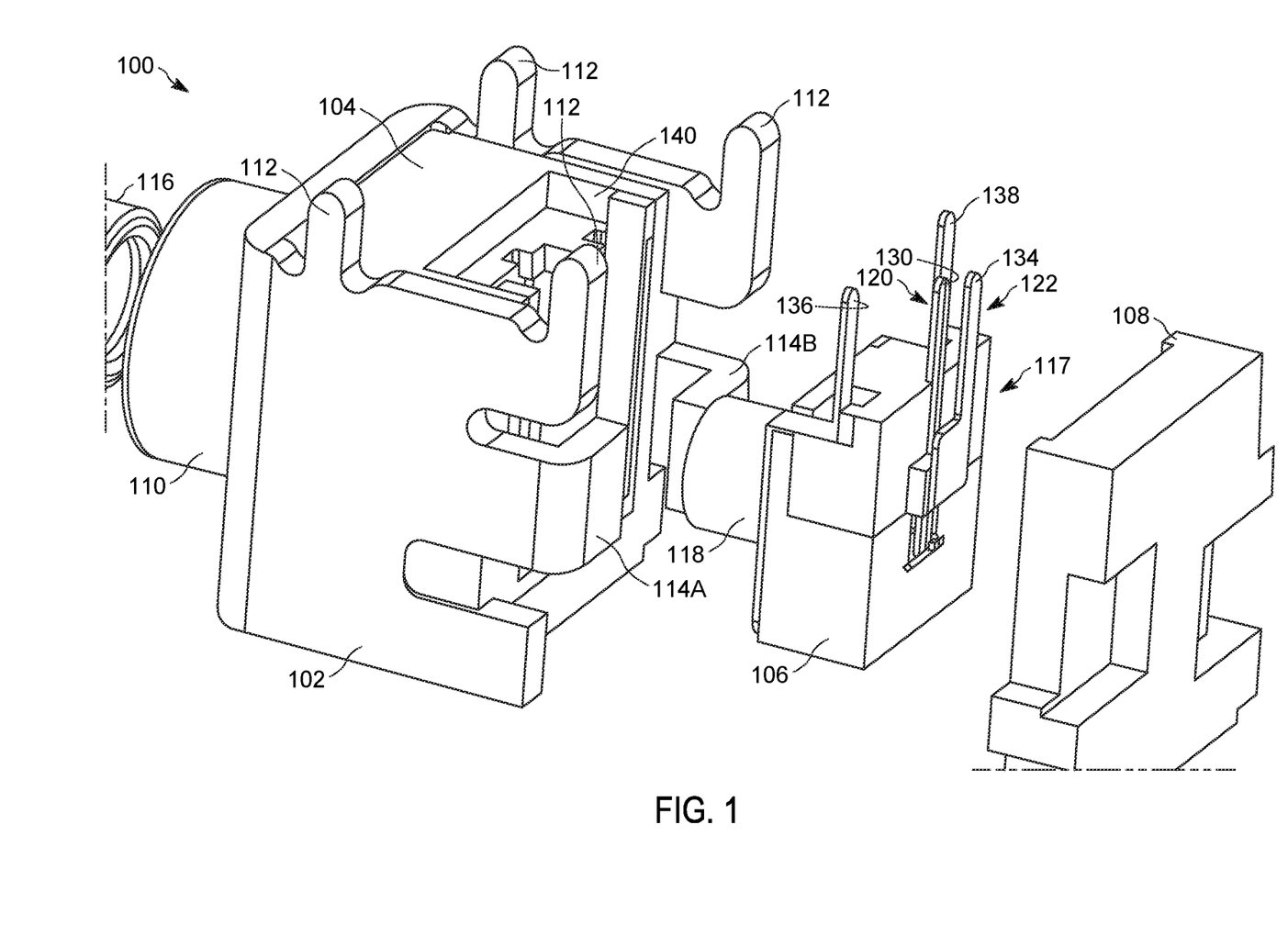
FIG. 1 is an exploded view of an example of an antenna connector with an integrated RF switch, in accordance with some implementations.

FIG. 1 is an exploded view of an example of an antenna connector 100 for a portable communication device (for example, a two-way radio). The antenna connector 100 illustrated in FIG. 1 includes a housing bracket 102, a core mounting member 104, a front mounting member 106, and a back mounting member 108. In some implementations, the antenna connector 100 includes more or less components in configurations different from the one illustrated in FIG. 1. As described in more detail below, the front mounting member 106 and the back mounting member 108 sandwich the core mounting member 104 to provide a line-to-line stack.

The housing bracket 102 includes an antenna barrel 110, a plurality of tabs 112, and a pair of clamps 114A and 114B. The antenna barrel 110 is configured to engage a ferrule antenna connector 116. For example, the inner surface of the antenna barrel 110 may be threaded to receive a threaded matching connector of a ferrule antenna. The plurality of tabs 112 are configured to mount and electrically connect the housing bracket 102 to, for example, a printed circuit board (PCB). The pair of clamps 114A and 114B are configured to keep the back mounting member 108 coupled to the front mounting member 106.

Figure 2:
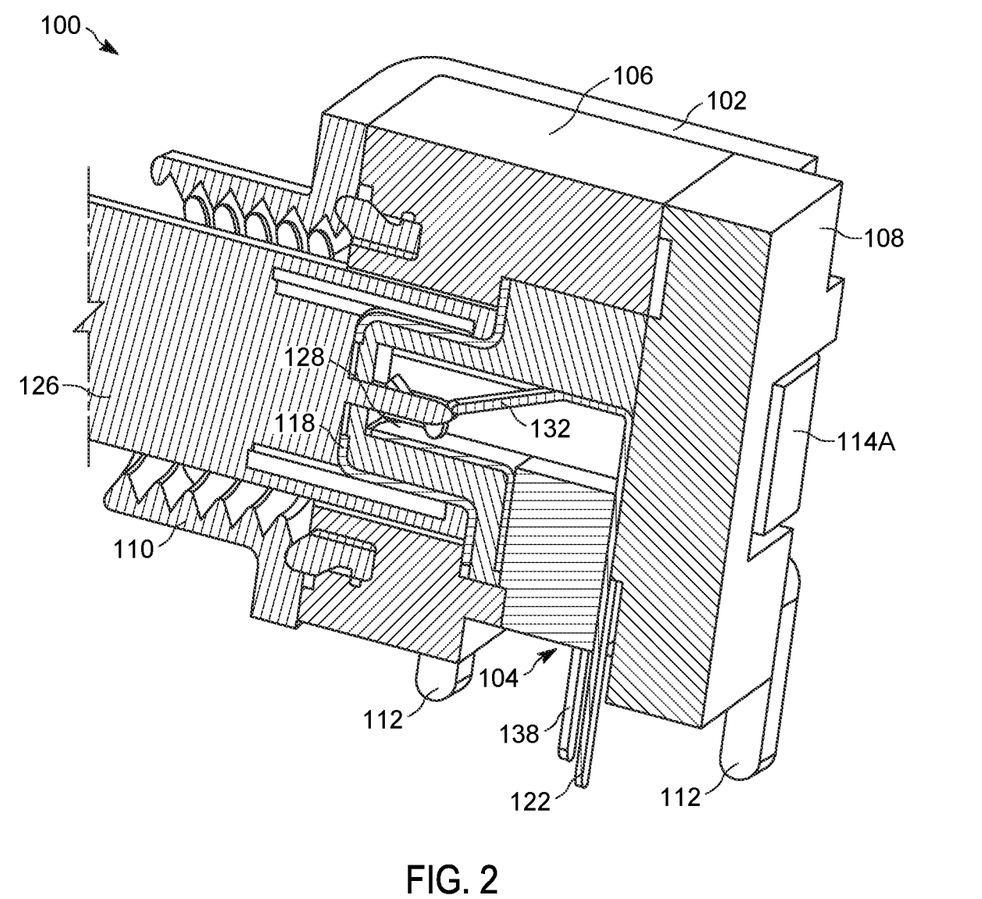
FIG. 2 is a perspective view of a cross-section of the antenna connector of FIG. 1.

The core mounting member 104 includes an RF (radio-frequency) switch 117. The RF switch 117 includes a ground barrel 118, a first electrical contact 120, a second electrical contact 122, and a ground plate 124. The ground barrel 118 is configured to engage a coaxial connector. For example, the ground barrel 118 is configured to receive a coaxial connector of a test probe 126 as illustrated in FIG. 2. The first electrical contact 120 includes a fixed axial member 128 and a first radial member 130 as illustrated, for example, in FIGS. 3 and 4. The fixed axial member 128 is partially positioned within the ground barrel 118. The first radial member 130 partially extends out from the core mounting member 104 for electrically connecting to, for example, a printed circuit board. The second electrical contact 122 includes a movable axial member 132 and a second radial member 134 as illustrated, for example, in FIGS. 3 and 4. The movable axial member 132 is partially positioned within the ground barrel 118. The second radial member 134 partially extends out from the core mounting member 104 for electrically connecting to, for example, a printed circuit board.

Figure 3:
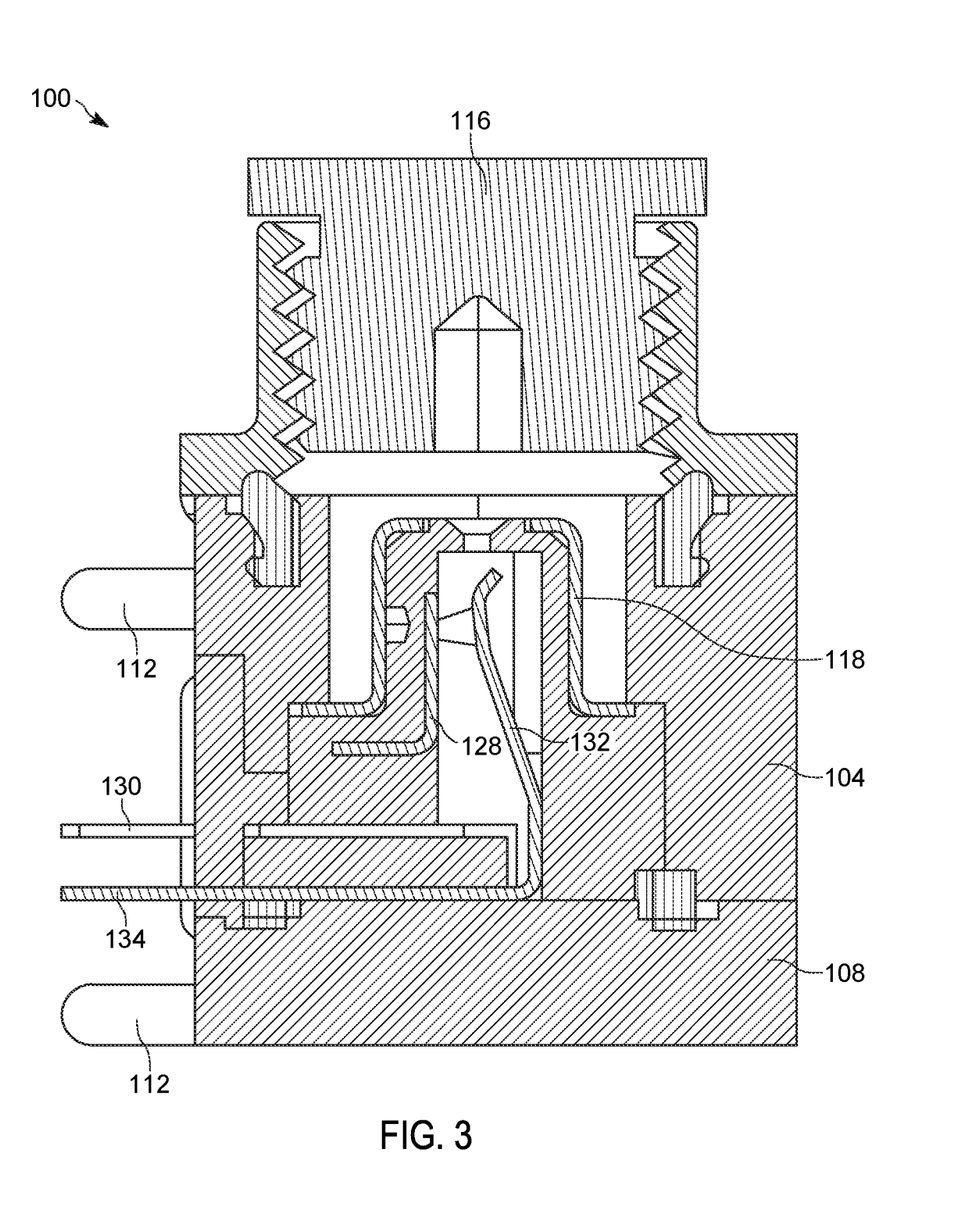
FIG. 3 is a side view of a cross-section the antenna connector of FIG. 1 with a ferrule antenna attached.
Figure 4:
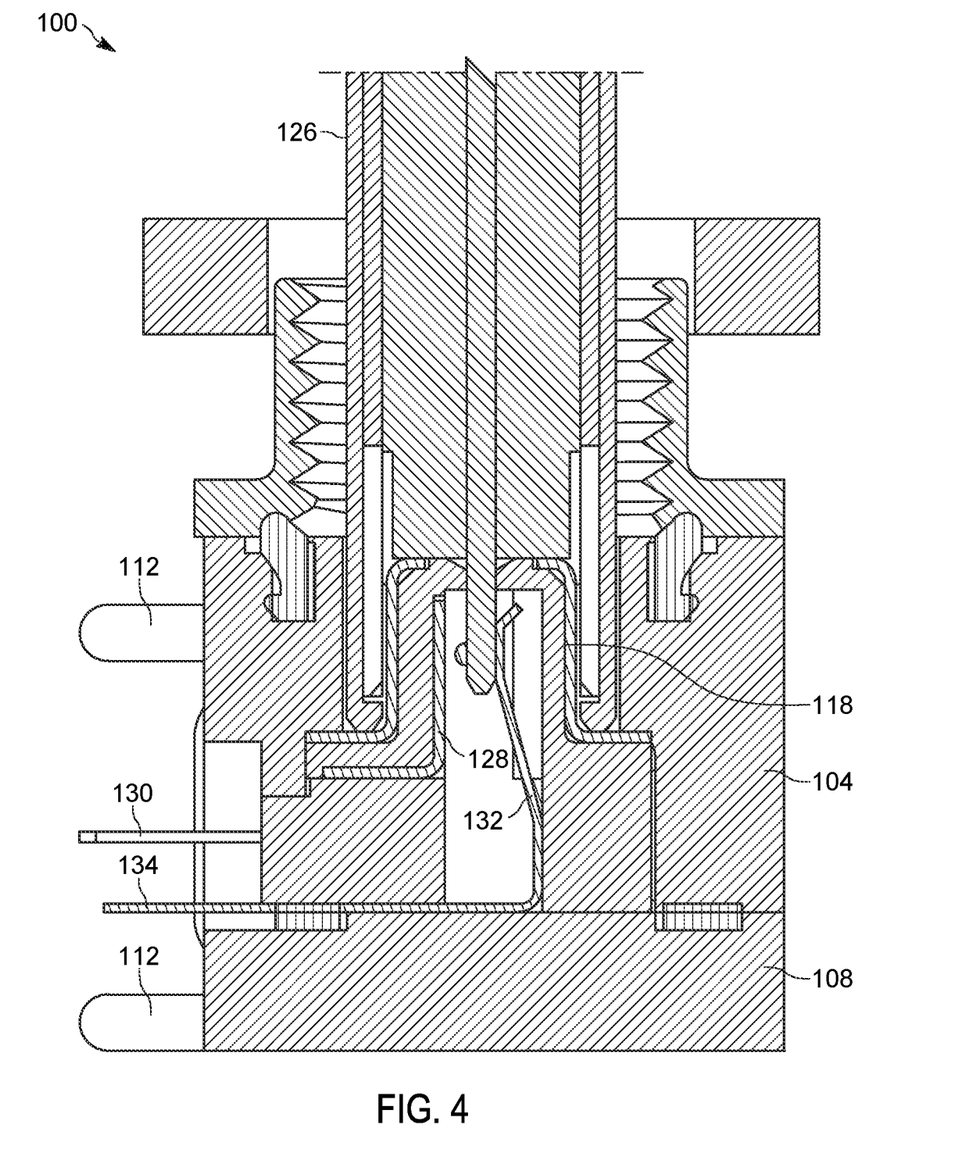
FIG. 4 is a side view of a cross-section of the antenna connector of FIG. 1 with a test probe attached.

The second electrical contact 122 is biased for contact with the first electrical contact 120. In some implementations, the movable axial member 132 is biased for contact with the fixed axial member 128. For example, as illustrated in FIG. 3, the movable axial member 132 of the second electrical contact 122 is connected to the fixed axial member 128 of the first electrical contact 120 when the ferrule antenna connector 116 is connected to the antenna connector 100. The second electrical contact 122 is configured to disconnect from the first electrical contact 120 when a coaxial connector engages completely with the ground barrel 118. In some implementations, the movable axial member 132 is configured to separate from the fixed axial member 128 when coaxial connector is inserted into the ground barrel 118. For example, the movable axial member 132 of the second electrical contact 122 is configured to separate from the fixed axial member 128 of the first electrical contact 120 when the center pin of the test probe 126 is inserted into the ground barrel 118 as illustrated in FIG. 4.

Figure 5A:
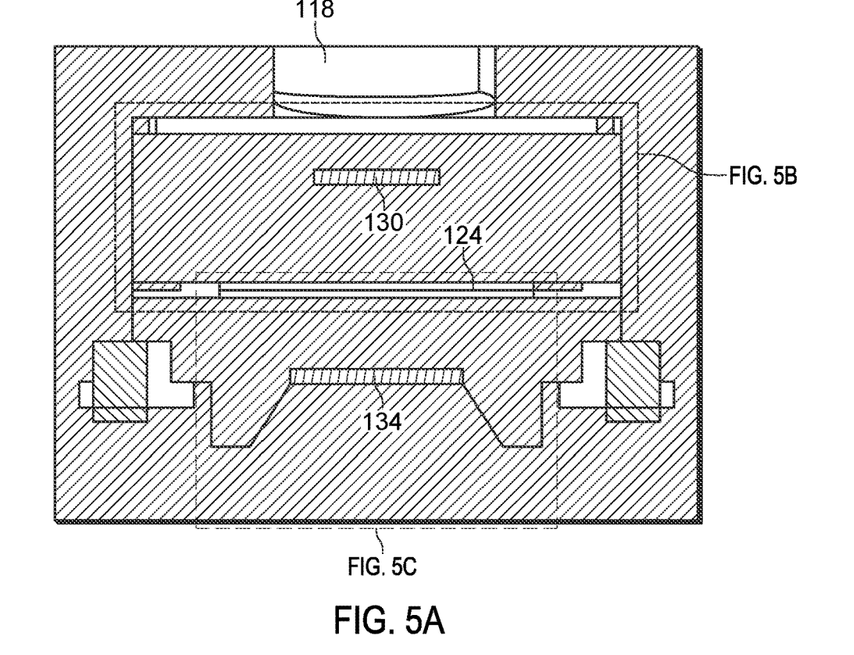
FIG. 5A is a side view of a partial cross-section of a ground barrel, a ground plate, and two electrical contacts included in the antenna connector of FIG. 1.
Figure 5B:
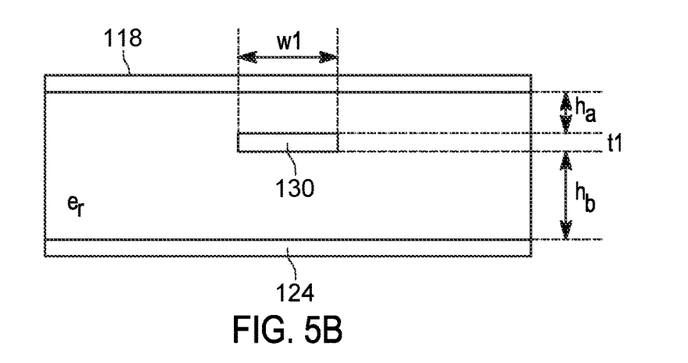
FIG. 5B is an enlarged view of a portion of FIG. 5A including the ground barrel, the ground plate, and one of the two electrical contacts.

The first radial member 130 and the second radial member 134 are spaced apart from each other in an axial direction as illustrated in FIG. 5A. The ground plate 124 is positioned between the first electrical contact 120 and the second electrical contact 122 to form a 50-ohm impedance line. For example, in some implementations, the ground plate 124 is positioned between the first radial member 130 and the second radial member 134 as illustrated in FIG. 5A. FIG. 5B is an enlarged view of a portion of FIG. 5A illustrating the asymmetric stripline construction of the first radial member 130 of the first electrical contact 120. The width, w1, of the first radial member 130 can be determined from the equation below by setting the characteristic impedance, $Z_0$, equal to 50-ohms:

$$Z_o \approx \frac{80}{\sqrt{e_r}} \times \ln\left(\frac{1.9 \times (2h_a + t1)}{(0.8w1 + t1)}\right) \times \left(1 - \frac{h_a}{4 \times h_b}\right) \quad \text{Equation 1}$$

where:
$Z_0$=characteristic impedance,
$e_r$=dielectric constant for plastic,
$h_a$=distance between the first radial member 130 and the ground barrel 118,
t1=thickness of the first radial member 130,
w1=width of the first radial member 130, and
$h_b$=distance between the first radial member 130 and the ground plate 124.

Figure 5C:
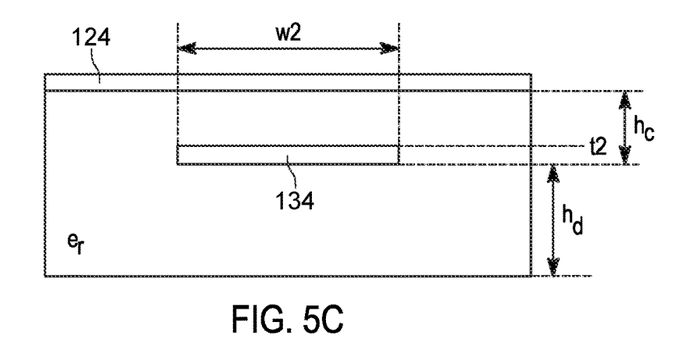
FIG. 5C is an enlarged view of a portion of FIG. 5A including the ground plate and the other of the two electrical contacts.

FIG. 5C is an enlarged view of another portion of FIG. 5A illustrating the embedded microstrip construction of the second radial member 134 of the second electrical contact 122. The effective dielectric constant of the structure, $e_{reff}$, can be determined, for example, according to the following equation:

$$e_{reff} = e_r\left(1 - \exp\left(-1.55\left(\frac{(h_c + h_d)}{(h_c - t2)}\right)\right)\right) \quad \text{Equation 2}$$

where:
$e_r$=dielectric constant for plastic,
$h_c$=distance between the second radial member 134 and the ground plate 124,
$h_d$=thickness of a plastic portion adjacent to the second radial member 134 as illustrated in FIG. 5C, and
t2=thickness of the second radial member 134.

The width, w2, of the second radial member 134 can be determined from the equation below by setting the characteristic impedance, $Z_0$, equal to 50-ohms:

$$Z_o \approx \frac{60}{\sqrt{e_{reff}}} \times \ln\left(\frac{5.98 \times (h_c - t2)}{0.8w2 + t2}\right) \quad \text{Equation 3}$$

where:

$Z_0$=characteristic impedance, $e_{reff}$ effective dielectric constant for the embedded microstrip structure, $h_c$=distance between the second radial member 134 and the ground plate 124, t2=thickness of the second radial member 134, and w2=width of the first radial member 134.

Figure 6:
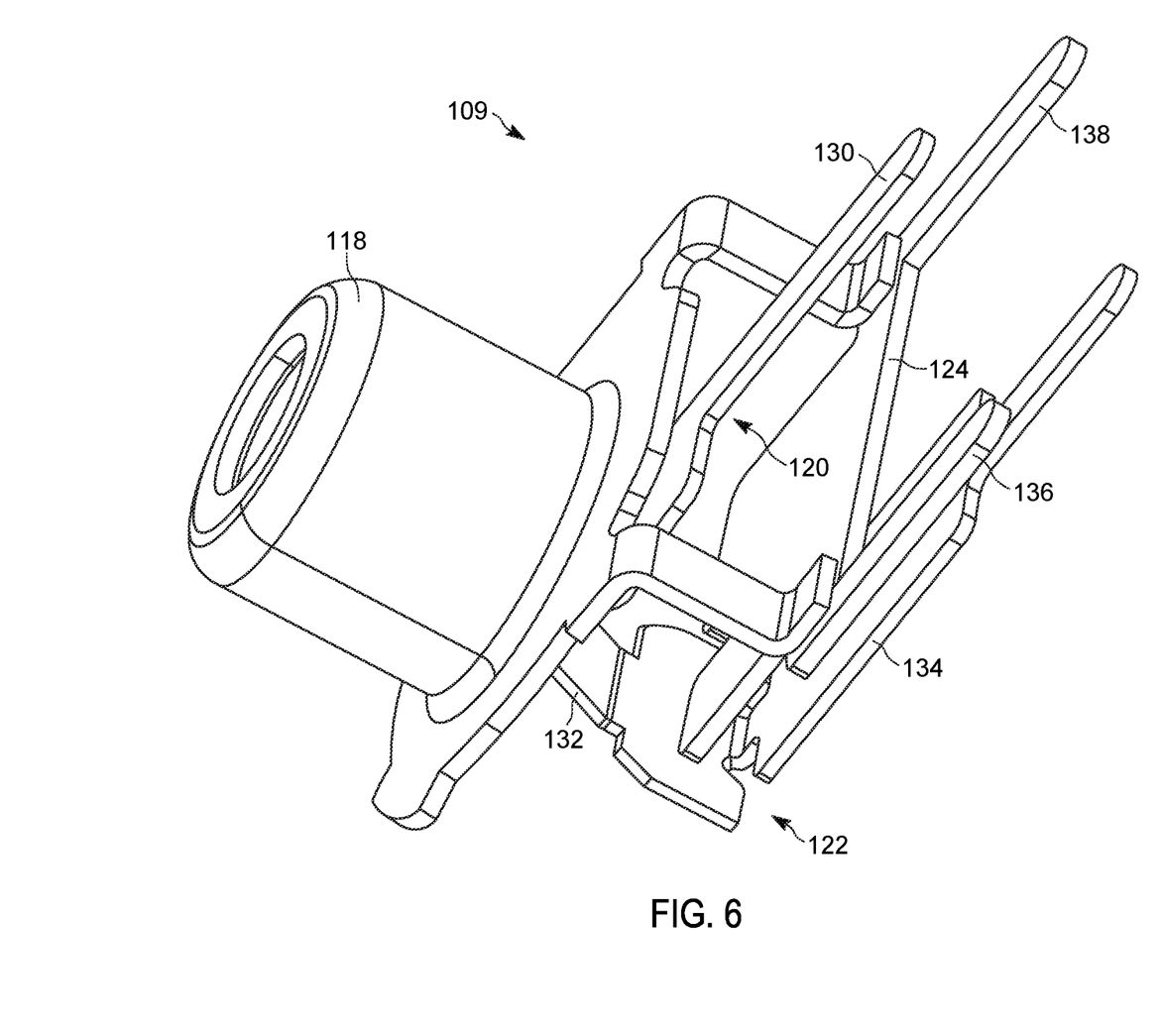
FIG. 6 is a perspective view of an example of a radio-frequency switch included in the antenna connector of FIG. 1, in accordance with some implementations.

The ground barrel 118 is electrically coupled to the ground plate 124 as illustrated in FIG. 6. In some implementations, the ground barrel 118 and the ground plate 124 are welded and riveted together to become unibody. Electrically coupling the ground barrel 118 to the ground plate 124 ensures an equal grounding level and simplifies the pin out to a printed circuit board by reducing the number of pins from four to two. For example, in some implementations, two ground pins 136 and 138 are coupled to the ground plate 124. The two ground pins 136 and 138 extend out from the core mounting member 104 for electrical connection to, for example, a printed circuit board.

The front mounting member 106 engages with the interior surface of the housing bracket 102 that is adjacent to the antenna barrel 110. The front mounting member 106 includes a front guiding section 140 that is configured to receive the core mounting member 104. The front guiding section 140 aligns the ground barrel 118 with the antenna barrel 110 to maintain concentricity therebetween prior to the back mounting member 108 being connected to the front mounting member 106. In some implementations, the front guiding section 140 is configured to align a center axis of the ground barrel 118 with a center axis of the antenna barrel 110. The back mounting member 108 includes a back guiding section 142 that is configured to keep the core mounting member 104 connected to the front guiding section 140. Upon being connected to the front mounting member 106, the back mounting member 108 is kept connected to the front mounting member 106 by the pair of clamps 114A and 114B. The core mounting member 104 is sandwiched between the front mounting member 106 and the back mounting member 108.

Figure 7A:
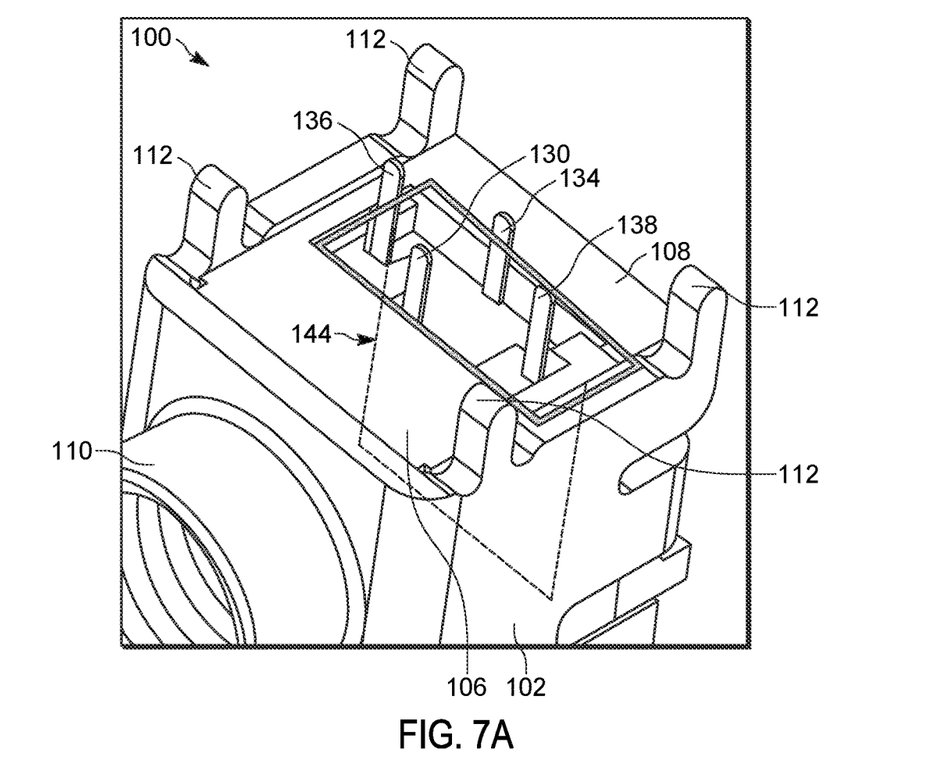
FIG. 7A is a perspective view illustrating an example of a U-shaped channel formed in an antenna connector, in accordance with some implementations.
Figure 7B:
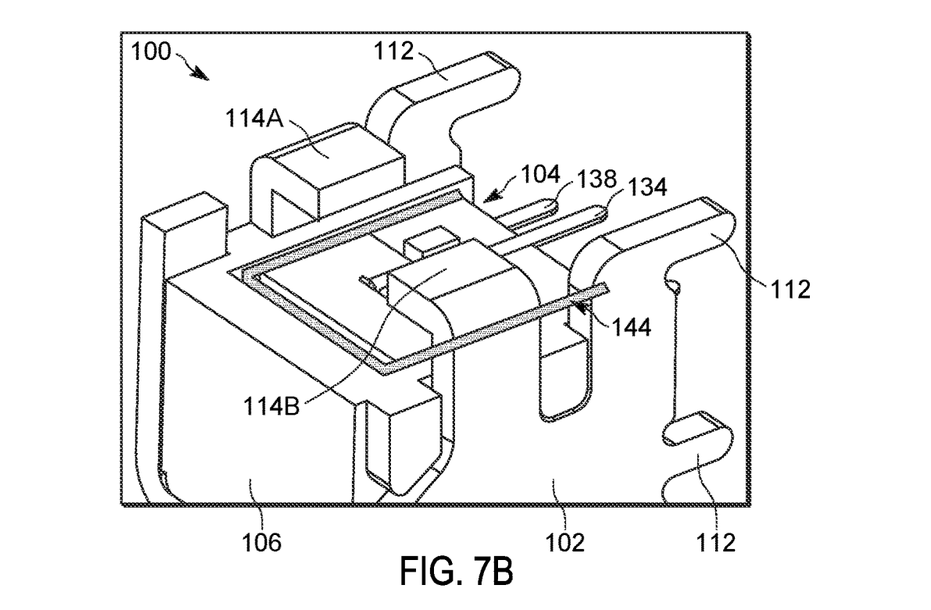
FIG. 7B is another perspective view illustrating the U-shaped channel formed in the antenna connector of FIG. 7A with a back mounting member removed, in accordance with some implementations.

As described above, four pins (i.e., the first radial member 130, the second radial member 134, and the two ground pins 136 and 138) extend out from the core mounting member 104 for electrical connection to, for example, a printed circuit board. In some implementations, the four pins extend out from the core mounting member 104 in a common direction, for example, as illustrated in FIG. 7A. In some implementations, as illustrated in FIGS. 7A and 7B, the front guiding section 140 and the back guiding section 142 define a U-shaped channel 144 around the core mounting member 104 for water sealing. The U-shaped channel 144 may be filled, for example, with a dispensed epoxy, a dispensed silicone, a silicone rubber gasket, or a combination thereof.

Figure 8:
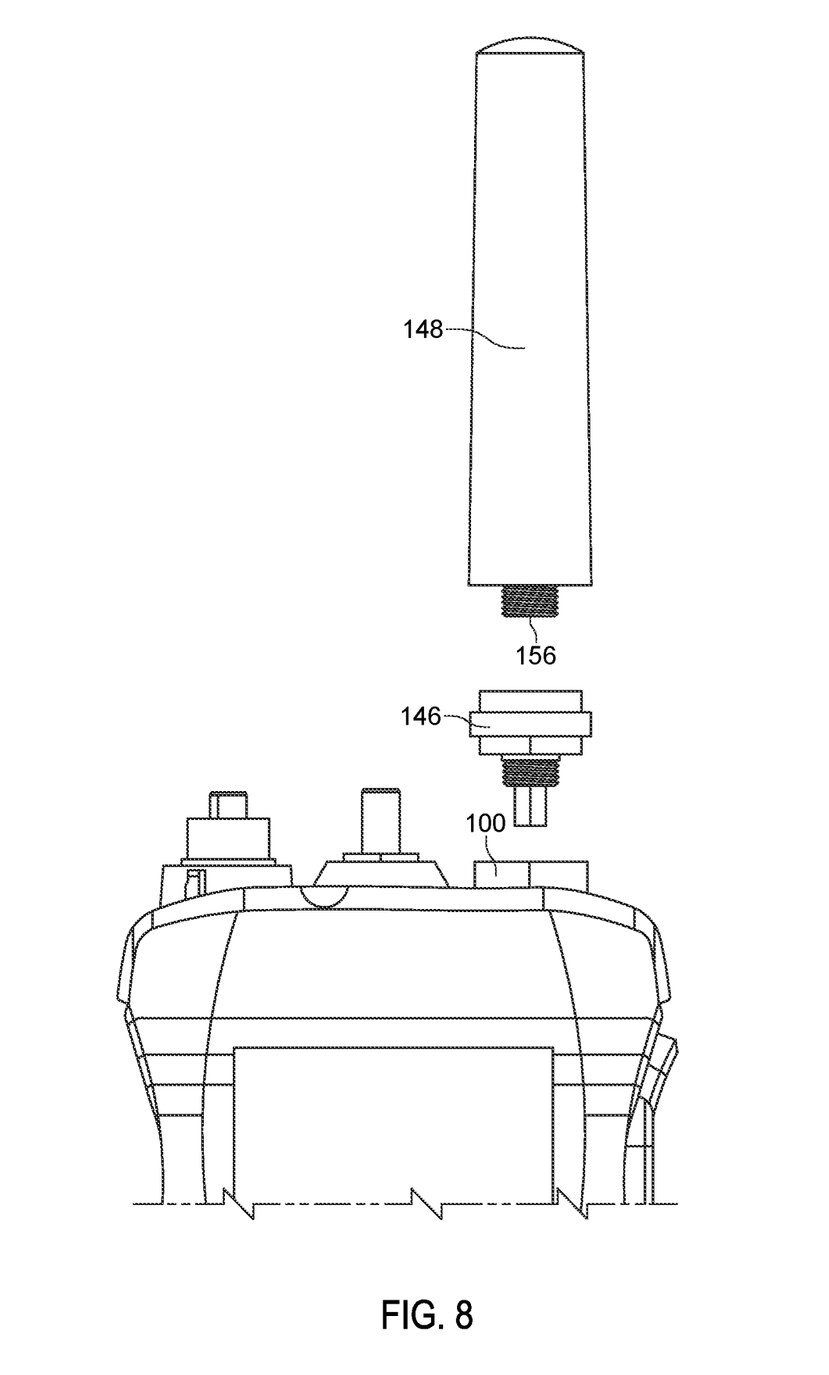
FIG. 8 is an exploded view of an example of an adapter for connecting an SMA antenna to the antenna connector of FIG. 1, in accordance with some implementations.
Figure 9:
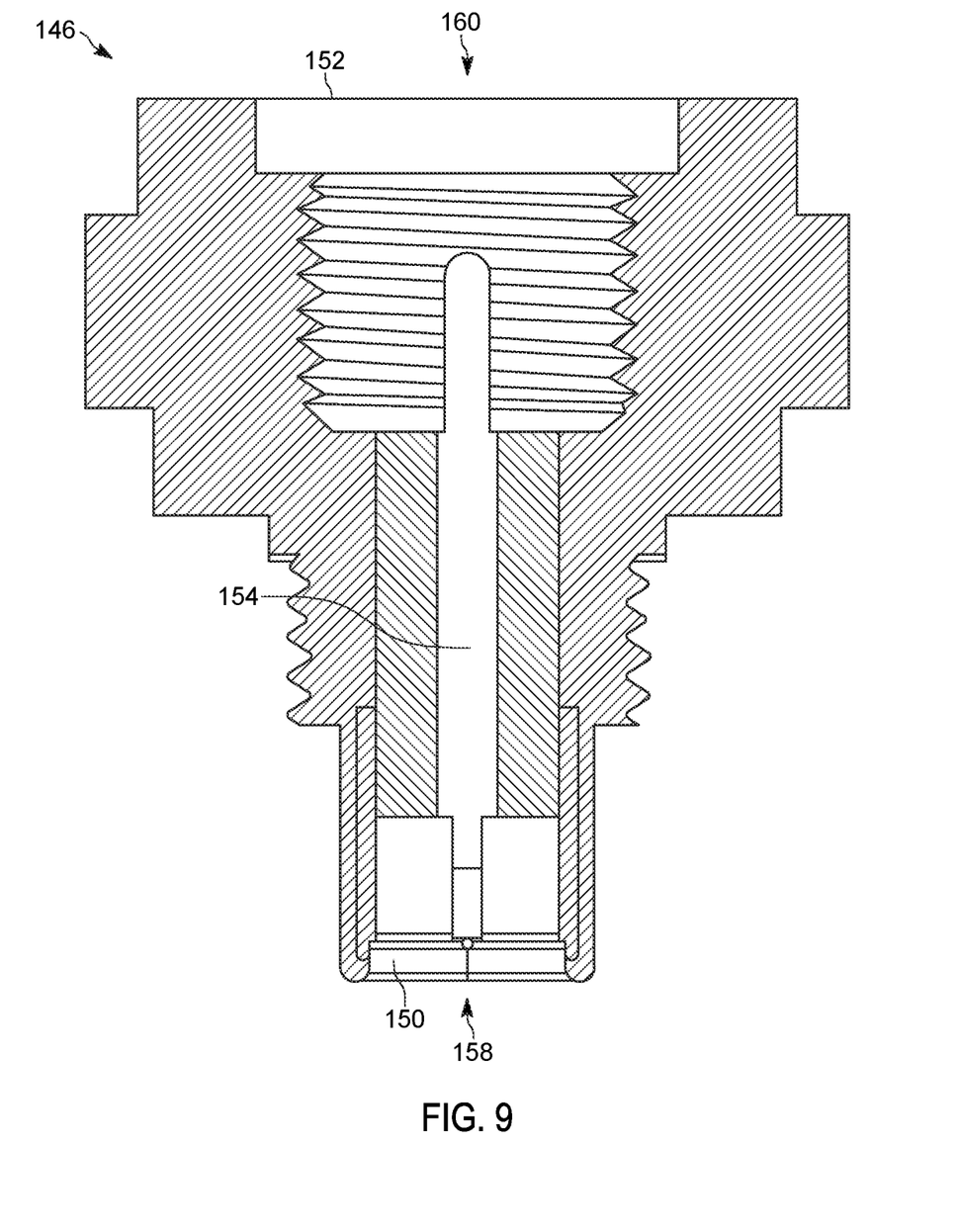
FIG. 9 is a side view of a cross-section of the adapter of FIG. 8, in accordance with some implementations.

In some implementations, an adapter 146 is connected the antenna connector 100 to enable connection of an SMA antenna 148, as illustrated in FIG. 8. As illustrated in FIG. 9, the adapter 146 includes a first connector 150, a second connector 152, and a center pin 154. The first connector 150 is configured to connect with the ground barrel 118. The second connector 152 is configured to engage an SMA antenna connector 156. When the adapter 146 is connected to the antenna connector 100, a first end 158 of the center pin 154 is positioned within the ground barrel 118 and a second end 160 of the center pin 154 is positioned within the second connector 152. Using the adapter 146 enables a ferrule radio to be converted into an SMA radio.

In the foregoing specification, specific implementations have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An antenna connector for a portable communication device, the antenna connector comprising:
   a housing bracket including an antenna barrel configured to engage a ferrule antenna connector;
   a core mounting member including a radio frequency (RF) switch, wherein the RF switch comprises:
      a ground barrel configured to engage a coaxial connector,
      a first electrical contact, and
      a second electrical contact biased for contact with the first electrical contact, the second electrical contact being configured to disconnect from the first electrical contact when the coaxial connector engages with the ground barrel;
   a front mounting member connected to the housing bracket, wherein the front mounting member includes a front guiding section configured to connect with the core mounting member and to align a center axis of the ground barrel with a center axis of the antenna barrel; and
   a back mounting member including a back guiding section to keep the core mounting member connected to the front guiding section.

2. The antenna connector of claim 1, wherein the RF switch further comprises a ground plate positioned between the first electrical contact and the second electrical contact to form a 50-ohm impedance line.

3. The antenna connector of claim 2, wherein the ground barrel is electrically coupled to the ground plate.

4. The antenna connector of claim 2, wherein the first electrical contact includes a fixed axial member partially positioned within the ground barrel and a first radial member partially extending out from the core mounting member for electrically connecting to a printed circuit board (PCB), and wherein the second electrical contact includes a movable axial member partially positioned within the ground barrel and a second radial member partially extending out from the core mounting member for electrically connecting to the PCB.

5. The antenna connector of claim 4, wherein the movable axial member is biased for contact with the fixed axial member, and wherein the movable axial member is configured to separate from the fixed axial member when a center pin of the coaxial connector is inserted into the ground barrel.

6. The antenna connector of claim 4, wherein the first radial member is spaced apart from the second radial member in an axial direction, and wherein the ground plate is positioned between the first radial member and the second radial member.

7. The antenna connector of claim 1, further comprising an adapter including:
   a first connector configured to connect with the ground barrel,
   a second connector configured to engage a Sub-Miniature version A (SMA) antenna connector, and
   a center pin with a first end positioned within the ground barrel and a second end positioned within the second connector.

8. The antenna connector of claim 1, wherein the housing bracket further includes a pair of clamps configured to keep the back mounting member connected to the front mounting member.

9. The antenna connector of claim 1, wherein the housing bracket further includes a plurality of tabs for mounting and electrically connecting to a printed circuit board.

10. The antenna connector of claim 1, wherein the housing bracket is made of metal, and wherein the front mounting member and the back mounting member are made of plastic.

11. An antenna connector for a portable communication device, the antenna connector comprising:
   a housing bracket including an antenna barrel configured to engage a ferrule antenna connector;
   a core mounting member including a radio frequency (RF) switch, wherein the RF switch comprises:
      a ground barrel configured to engage a coaxial connector,
      a first electrical contact, and
      a second electrical contact biased for contact with the first electrical contact, the second electrical contact being configured to disconnect from the first electrical contact when the coaxial connector engages with the ground barrel;
   a front mounting member connected to the housing bracket, wherein the front mounting member includes a front guiding section configured to connect with the core mounting member and to align the ground barrel with the antenna barrel; and
   a back mounting member including a back guiding section to keep the core mounting member connected to the front mounting member,
   wherein the front guiding section and the back guiding section define a U-shaped channel around the core mounting member for water sealing.

12. The antenna connector of claim 11, wherein the U-shaped channel is filled with an epoxy or a rubber gasket.

13. The antenna connector of claim 11, wherein the RF switch further comprises a ground plate positioned between the first electrical contact and the second electrical contact to form a 50-ohm impedance line.

14. The antenna connector of claim 13, wherein the ground barrel is electrically coupled to the ground plate.

15. The antenna connector of claim 13, wherein the first electrical contact includes a fixed axial member partially positioned within the ground barrel and a first radial member partially extending out from the core mounting member for electrically connecting to a printed circuit board (PCB), and wherein the second electrical contact including a movable axial member partially positioned within the ground barrel and a second radial member partially extending out from the core mounting member for electrically connecting to the PCB.

16. The antenna connector of claim 15, wherein the movable axial member is biased for contact with the fixed axial member, and wherein the movable axial member is configured to separate from the fixed axial member when a center pin of the coaxial connector is inserted into the ground barrel.

17. The antenna connector of claim 15, wherein the first radial member is spaced apart from the second radial member in an axial direction, and wherein the ground plate is positioned between the first radial member and the second radial member.

18. The antenna connector of claim 11, further comprising an adapter including:
a first connector configured to connect with the ground barrel,
a second connector configured to engage a Sub-Miniature version A (SMA) antenna connector, and
a center pin with a first end positioned within the ground barrel and a second end positioned within the second connector.

19. The antenna connector of claim 11, wherein the front guiding section is further configured to align a center axial axis of the ground barrel with a center axial axis of the antenna barrel.

20. The antenna connector of claim 11, wherein the housing bracket further includes a pair of clamps configured to keep the back mounting member coupled to the front mounting member.

* * * * *